US010253846B2

(12) United States Patent
Sugita et al.

(10) Patent No.: US 10,253,846 B2
(45) Date of Patent: Apr. 9, 2019

(54) DRIVE TRANSMITTER AND IMAGE FORMING APPARATUS INCORPORATING THE DRIVE TRANSMITTER

(71) Applicants: Narumi Sugita, Kanagawa (JP); Masahiro Ishida, Kanagawa (JP); Shogo Sakamoto, Kanagawa (JP); Naoki Matsuda, Kanagawa (JP)

(72) Inventors: Narumi Sugita, Kanagawa (JP); Masahiro Ishida, Kanagawa (JP); Shogo Sakamoto, Kanagawa (JP); Naoki Matsuda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/101,777

(22) Filed: Aug. 13, 2018

(65) Prior Publication Data
US 2018/0347667 A1 Dec. 6, 2018

Related U.S. Application Data

(63) Continuation of application No. 15/163,863, filed on May 25, 2016, now Pat. No. 10,082,192, which is a (Continued)

(30) Foreign Application Priority Data

Jun. 23, 2014 (JP) .................................. 2014-128368

(51) Int. Cl.
*F16H 1/10* (2006.01)
*F16H 57/04* (2010.01)
(Continued)

(52) U.S. Cl.
CPC ........... *F16H 1/10* (2013.01); *F16H 57/0464* (2013.01); *F16H 57/0495* (2013.01);
(Continued)

(58) Field of Classification Search
CPC ..... F16H 1/10; F16H 57/0464; G03G 15/757; Y10T 74/19647
See application file for complete search history.

(56) References Cited

U.S. PATENT DOCUMENTS 5,820,504 A * 10/1998 Geralde .................... F16H 1/32
  475/177
6,473,580 B1 * 10/2002 Inomata .................. F16D 1/112
  399/111
(Continued)

FOREIGN PATENT DOCUMENTS

JP          2036898 A      2/1990
JP       H09-222759 A      8/1997
(Continued)

OTHER PUBLICATIONS

Office Action for Corresponding Japanese Patent Application No. 2014-128368 dated Feb. 16, 2018.
(Continued)

*Primary Examiner* — Ryan D Walsh
(74) *Attorney, Agent, or Firm* — Harness, Dickey & Pierce, P.L.C.

(57) ABSTRACT

A drive transmitter includes an internally toothed gear, a first support shaft to rotatably support the internally toothed gear without using a bearing, a drive source to apply a driving force to the internally toothed gear, a rotary body to which the driving force is transmitted via the internally toothed gear, and a grease retainer disposed on the first support shaft and to retain grease on at least one of a portion of the first support shaft facing the internally toothed gear and a portion of the internally toothed gear facing the first support shaft. An image forming apparatus includes the drive transmitter.

8 Claims, 13 Drawing Sheets

Related U.S. Application Data continuation of application No. 14/743,693, filed on Jun. 18, 2015, now Pat. No. 9,382,971.

(51) Int. Cl.
  *G03G 15/00* (2006.01)
  *G03G 21/16* (2006.01)
  *G03G 21/18* (2006.01)

(52) U.S. Cl.
  CPC ....... *G03G 15/757* (2013.01); *G03G 21/1647* (2013.01); *G03G 21/1857* (2013.01); *G03G 2221/1657* (2013.01); *Y10T 74/19647* (2015.01)

(56) References Cited

U.S. PATENT DOCUMENTS

| | | | | |
|---|---|---|---|---|
| 7,272,342 | B2* | 9/2007 | Nagashima | G03G 15/5008 399/117 |
| 8,845,472 | B2 | 9/2014 | Matsuda et al. | |
| 9,382,971 | B2 | 7/2016 | Sugita et al. | |
| 2009/0245869 | A1* | 10/2009 | Nieda | G03G 15/0136 399/167 |
| 2011/0170892 | A1 | 7/2011 | Ishida et al. | |
| 2011/0206438 | A1 | 8/2011 | Igarashi et al. | |
| 2012/0060633 | A1 | 3/2012 | Ishida et al. | |
| 2014/0123796 | A1 | 5/2014 | Ishida et al. | |
| 2015/0060191 | A1 | 3/2015 | Matsuda et al. | |

FOREIGN PATENT DOCUMENTS

| | | |
|---|---|---|
| JP | H09-242851 A | 9/1997 |
| JP | H11311302 A | 11/1999 |
| JP | 2000081031 A | 3/2000 |
| JP | 2000-205383 A | 7/2000 |
| JP | 2004-246185 A | 9/2004 |
| JP | 2007292124 A | 11/2007 |
| JP | 2013217467 | 10/2013 |
| JP | 2014-111983 A | 6/2014 |

OTHER PUBLICATIONS

Office Action for Corresponding Japanese Patent Application No. 2014-128368 dated May 11, 2018.

* cited by examiner

DRIVE TRANSMITTER AND IMAGE FORMING APPARATUS INCORPORATING THE DRIVE TRANSMITTER

CROSS-REFERENCE TO RELATED APPLICATIONS

This application is a continuation application of and claims priority under 35 U.S.C. § 120/121 to U.S. application Ser. No. 15/163,863 filed May 25, 2016, which is a continuation application of and claims priority under 35 U.S.C. § 120/121 to U.S. application Ser. No. 14/743,693 filed Jun. 18, 2015, which claims priority under 35 U.S.C. § 119 to Japanese Patent Application No. 2014-128368, filed on Jun. 23, 2014, in the Japan Patent Office, the entire contents of each of which are hereby incorporated by reference herein.

BACKGROUND

Technical Field

This disclosure relates to a drive transmitter and an image forming apparatus that includes the drive transmitter.

Related Art

Drive devices are used for image formation performed in an image forming apparatus such as a copier, printer, facsimile machine, and multifunction peripherals including at least two functions of the copier, printer, and facsimile machine. Specifically, drive devices are used to drive a photoconductor and a transfer belt.

An example of the drive device includes an internally toothed gear that is a gear meshing with a motor gear of a drive motor. Such an internally toothed gear can increase a contact ratio to restrict vibration of the gears and block noise by the internally toothed gear.

SUMMARY

At least one aspect of this disclosure provides a drive transmitter including an internally toothed gear, a first support shaft to rotatably support the internally toothed gear without using a bearing, a drive source to apply a driving force to the internally toothed gear, a rotary body to which the driving force is transmitted via the internal toothed gear, and a grease retainer disposed on the first support shaft and to retain grease on at least one of a portion of the first support shaft facing the internally toothed gear and a portion of the internally toothed gear facing the first support shaft.

Further, at least one aspect of this disclosure provides an image forming apparatus including the drive transmitter.

DETAILED DESCRIPTION

Figure 1:
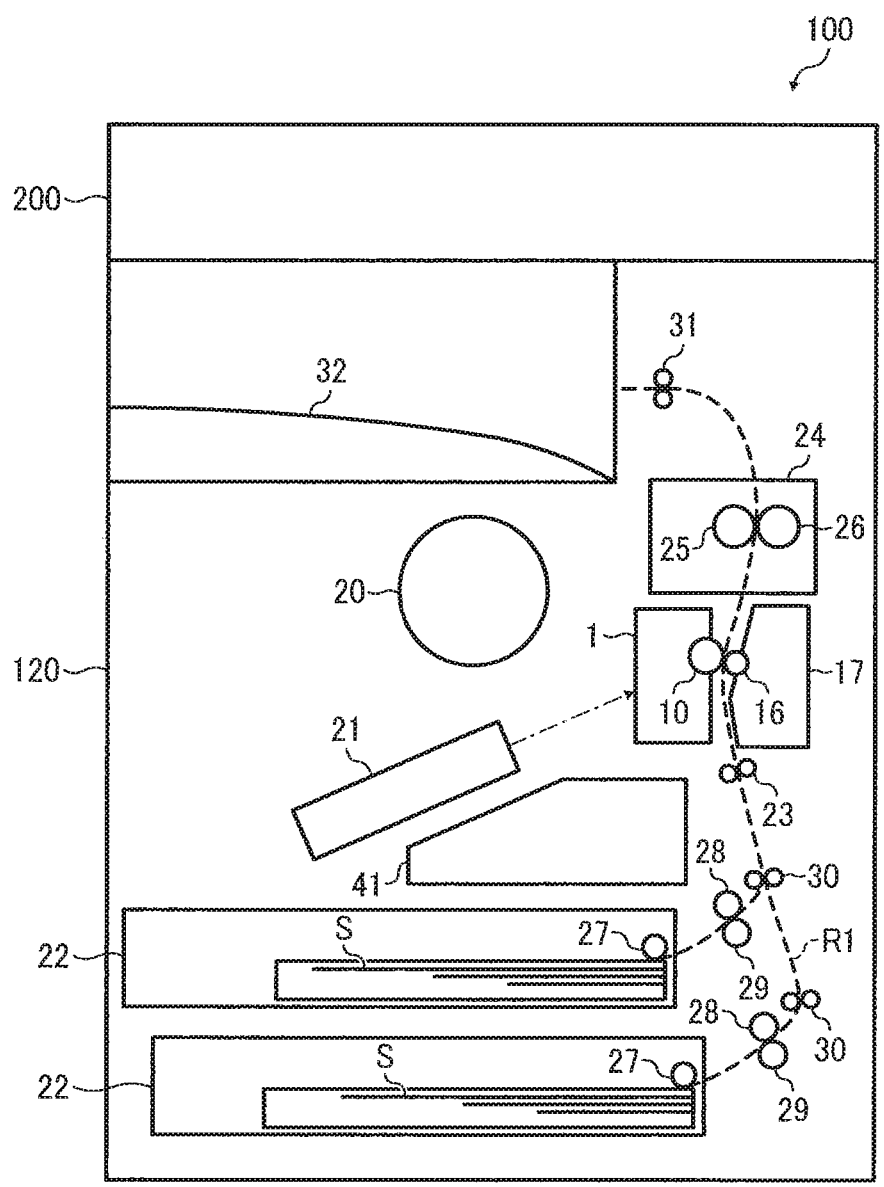
FIG. 1 is a diagram illustrating a schematic configuration of an image forming apparatus according to an example of this disclosure.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

Figure 2A:
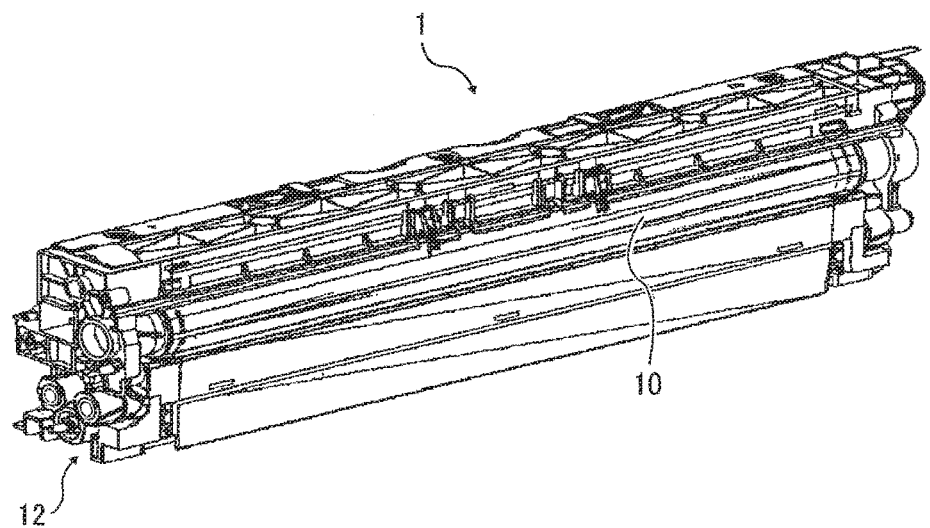
FIG. 2A is a perspective view illustrating a process cartridge included in the image forming apparatus of FIG. 1.
Figure 2B:
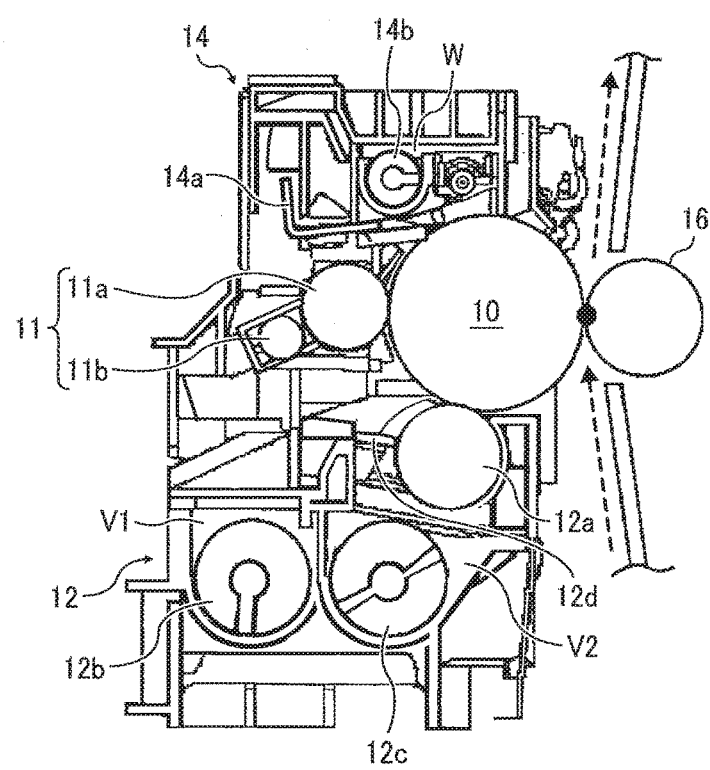
FIG. 2B is a cross sectional view illustrating the process cartridge of FIG. 2A.

Now, a description is given of an image forming apparatus 100 according to an example of this disclosure with reference to FIGS. 1, 2A, and 2B.

FIG. 1 is a diagram illustrating a schematic configuration of the image forming apparatus 100 according to an example of this disclosure. FIG. 2A is a perspective view illustrating a process cartridge 1 included in the image forming apparatus 100 of FIG. 1. FIG. 2B is a cross sectional view illustrating the process cartridge 1 of FIG. 2A.

The image forming apparatus 100 includes an image reading device 200 disposed on top of an apparatus body 120 of the image forming apparatus 100.

The apparatus body 120 of the image forming apparatus 100 includes the process cartridge 1, as illustrated in FIG. 1.

As illustrated in FIG. 2B, the process cartridge 1 includes a photoconductor 10, a charger 11, a developing device 12, and a cleaning device 14.

The photoconductor 10 functions as an image bearer. The charger 11, the developing device 12, and the cleaning device 14 are disposed around the photoconductor 10 to function as image processing units for forming an image on the photoconductor 10.

The process cartridge 1 is detachably attachable to the apparatus body 120. Since the photoconductor 10, the charger 11, the developing device 12, and the cleaning device 14 are provided together in the process cartridge 1 as a unit, replacement of the process cartridge 1 and maintenance of the image forming apparatus 100 can be performed easily. In addition, respective positions of the units and components in the image forming apparatus 100, and therefore quality of image formed in the image forming apparatus 100 can be enhanced.

The charger 11 includes a charging roller 11a and a removing roller 11b. The charging roller 11a uniformly charges a surface of the photoconductor 10. The removing roller 11b removes foreign material such as toner attached to the surface of the charging roller 11a.

The developing device 12 includes a first powder chamber V1 and a second powder chamber V2. The first powder chamber V1 is provided with a first conveying screw 12b that functions as a developer conveyor. The second powder chamber V2 is provided with a second conveying screw 12c that functions as a developer conveyor, a developing roller 12a that functions as a developer bearer, and a doctor blade 12d that functions as a developer regulator.

Both the first powder chamber V1 and the second powder chamber V2 contain developer, specifically, two-component developer that includes magnetic carriers and negatively charged toner. The first conveying screw 12b is rotated by a drive unit to convey the developer contained in the first powder chamber V1 toward a near side in FIG. 2B. The developer conveyed by the first conveying screw 12b to an end of the near side of the first powder chamber V1 in FIG. 2B enters in the second powder chamber V2.

The second conveying screw 12c of the second powder chamber V2 is rotated by a drive unit to convey the developer entered into the second powder chamber V2 toward a far side in the FIG. 2B. Above the second conveying screw 12c that conveys the developer as described above, the developing roller 12a is disposed in a parallel position with respect to the second conveying screw 12c. The developing roller 12a includes a magnet roller fixed inside a developing sleeve that is a rotary non-magnetic sleeve.

Part of the developer conveyed by the second conveying screw 12c is taken up to a surface of the developing roller 12a due to a magnetic force exerted by a magnet roller located inside the developing roller 12a. The doctor blade 12d is disposed facing the developing roller 12a with a given gap with the surface of the developing roller 12a and regulates a thickness of layer of the developer attached onto the surface of the developing roller 12a. After the doctor blade 12d regulates the layer thickness of the developer on the developing roller 12a, the developer on the developing roller 12a is conveyed to a developing region located at a position facing the photoconductor 10. In the developing region, toner of the developer is attached to an electrostatic latent image formed on the surface of the photoconductor 10. Thus, a toner image is formed on the photoconductor 10.

After consuming the toner due to the above-described development of the toner image, the developer is returned to the second conveying screw 12c along with movement of the surface of the developing roller 12a. The second conveying screw 12c conveys the toner-consumed developer to the end of the second powder chamber V2, so that the developer goes back to the first powder chamber V1. Accordingly, the developer circulates in the developing device 12.

The developing device 12 includes a toner concentration sensor that detects concentration of toner in the developer contained in the first powder chamber V1. The toner concentration sensor measures the concentration of toner in the developer based on magnetic permeability of the developer. As the concentration of toner decreases, the concentration of magnetic carriers in the developer increases, and therefore the magnetic permeability becomes higher.

When a value measured and obtained by the toner concentration sensor exceeds a target value, i.e., a threshold value, the toner is supplied from the toner bottle 20 to control the toner concentration to a constant value. The target value is determined based on a detection result obtained by an optical sensor that detects an amount of attachment of toner to a toner pattern formed on the photoconductor 10.

With the above-described operations, a reference pattern density on the photoconductor 10 is controlled to a constant value. However, when the toner bottle 20 is out of toner, a reduction in toner concentration cannot be prevented. In such a situation, even after the toner bottle 20 performs toner supply for a given time period, the detection result of the toner pattern obtained by the optical sensor is not corrected. Therefore, in a case in which the detection result of the toner pattern obtained by the optical sensor does not get better even after the toner bottle 20 supplies toner, a determination unit or a controller determines or estimates an end of toner in the toner bottle 20.

After the end of toner is determined by the determination unit or the controller, the toner bottle 20 is replaced to a new toner bottle 20. In an end-of-toner recovery performance, fresh toner in the new toner bottle 20 is supplied to the developing device 12 in the following procedures.

In order to mix the toner and the developer well, the developing roller 12a, the first conveying screw 12b, and the second conveying screw 12c are rotated. At the same time, in order to prevent nonuniformity of developer sliding on the developing roller 12a, the photoconductor 10 is also driven to rotate.

The cleaning device 14 that functions as a cleaner includes a cleaning blade 14a and a toner collecting coil 14b. The cleaning blade 14a contacts the surface of the photoconductor 10 and scrapes residual toner remaining on the surface of the photoconductor 10. The toner collecting coil 14b is contained in a collecting part W to convey collected toner that is collected by the cleaning blade 14a. The collected toner conveyed by the toner collecting coil 14b is conveyed by a toner conveying device to either the developing device 12 or a waste toner bottle 41.

The image forming apparatus 100 further includes a transfer device 17 a thermal fixing device 24, a laser writing device 21, and multiple sheet trays 22 in the apparatus body 120, as illustrated in FIG. 1.

The transfer device 17 includes a transfer roller 16 that is pressed against the surface of the photoconductor 10.

The thermal fixing device 24 that functions as a fixing device is disposed above the transfer device 17. The thermal fixing device 24 includes a heat roller 25 and a pressure roller 26.

The laser writing device 21 that functions as a latent image forming device includes a laser light source, a polygon mirror for scanning, a polygon motor, and a f-theta (fθ) lens.

Each of the multiple sheet trays 22 disposed vertically in steps accommodates a sheet S such as a transfer sheet and an overhead projector (OHP) sheet.

To generate a copy using the above-described image forming apparatus 100, a user or an operator presses a start switch provided on the image forming apparatus 100. As the start switch is pressed, the image reading device 200 of the image forming apparatus 100 scans image data of an original document placed thereon. At the same time, a photoconductor drive motor provided to the image forming apparatus 100 rotates the photoconductor 10, so that the charger 11 including the charging roller 11a uniformly charges the surface of the photoconductor 10. Then, the laser writing device 21 emits laser light based on the image data scanned by the image reading device 200 to irradiate the surface of the photoconductor 10 for forming an electrostatic latent image. Thereafter, the developing device 12 supplies toner to the electrostatic latent image, so as to develop the electrostatic latent image with the toner attached into a visible toner image.

At the same time the user presses the start switch, a pickup roller 27 picks up and feeds the sheet S from a selected one of the multiple sheet trays 22. A sheet feed roller 28 and a sheet separation roller 29 separate the sheet S one by one and convey the separated sheet S to a sheet feed path R1.

The sheet S fed to the sheet feed path R1 is conveyed by a sheet conveying roller 30. While traveling in the sheet feed path R1, the sheet S abuts against a registration roller pair 23 to stop. In synchronization with movement of the toner image formed on the surface of the photoconductor 10, the sheet S is conveyed to a transfer nip region that is formed between the transfer roller 16 and the photoconductor 10 in contact with each other.

The sheet S conveyed to the transfer nip region receives the toner image from the photoconductor 10 by the transfer device 17.

After transfer of the toner image to the sheet S, residual toner and residual electric potential remain on the surface of the photoconductor 10. The residual toner is removed by the cleaning device 14 and the residual electric potential is removed by an electric discharging device. Thus, the photoconductor 10 becomes ready for a subsequent image forming operation that starts from electric charges by the charger 11.

By contrast, the sheet S having the toner image thereon is conveyed to the thermal fixing device 24. In the thermal fixing device 24, the sheet S passes between the heat roller 25 and the pressure roller 26 to fix the toner image to the sheet S by application of heat and pressure while being conveyed by the heat roller 25 and the pressure roller 26. After the toner image is fixed to the sheet S, a sheet discharging roller pair 31 conveys the sheet S to a discharged sheet stacker 32 to be stacked thereon.

Figure 3:
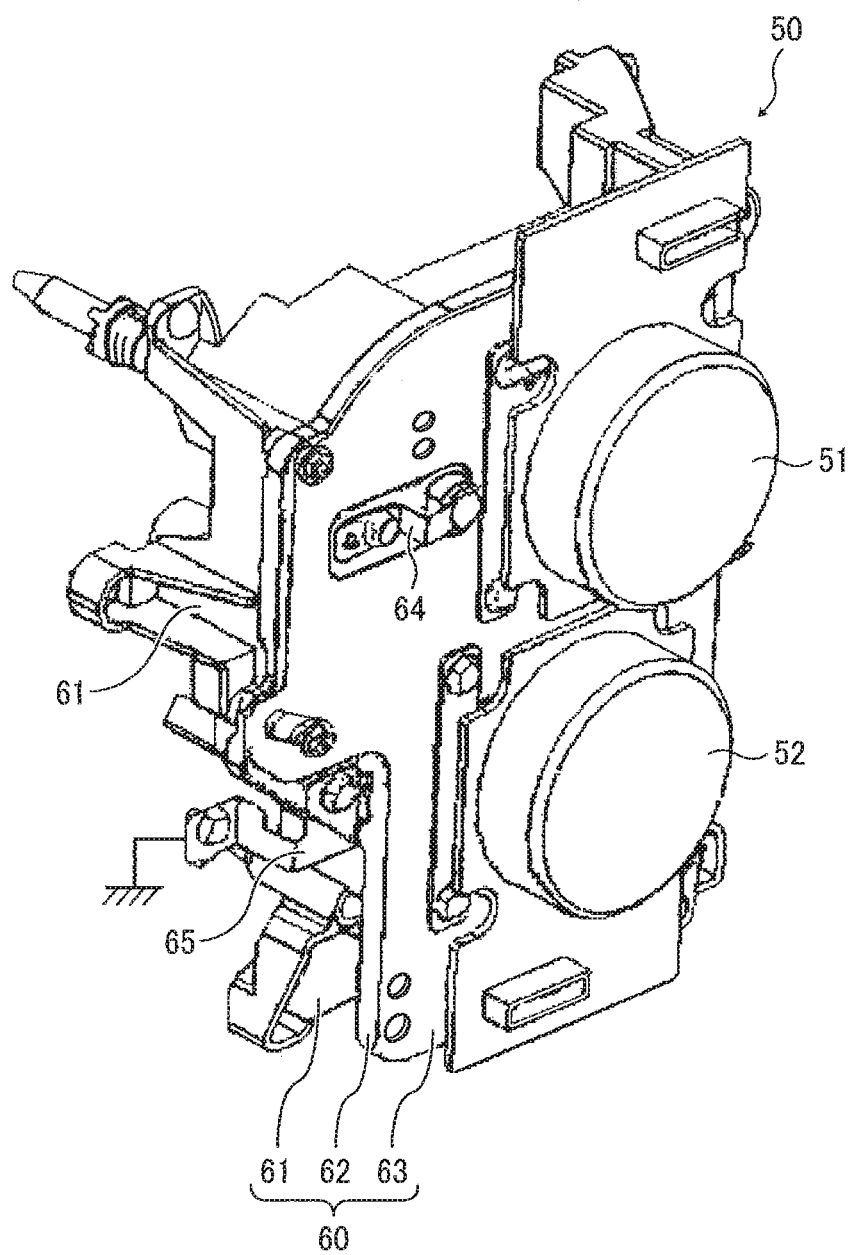
FIG. 3 is a perspective view illustrating a drive device included in the image forming apparatus of FIG. 1.
Figure 4:
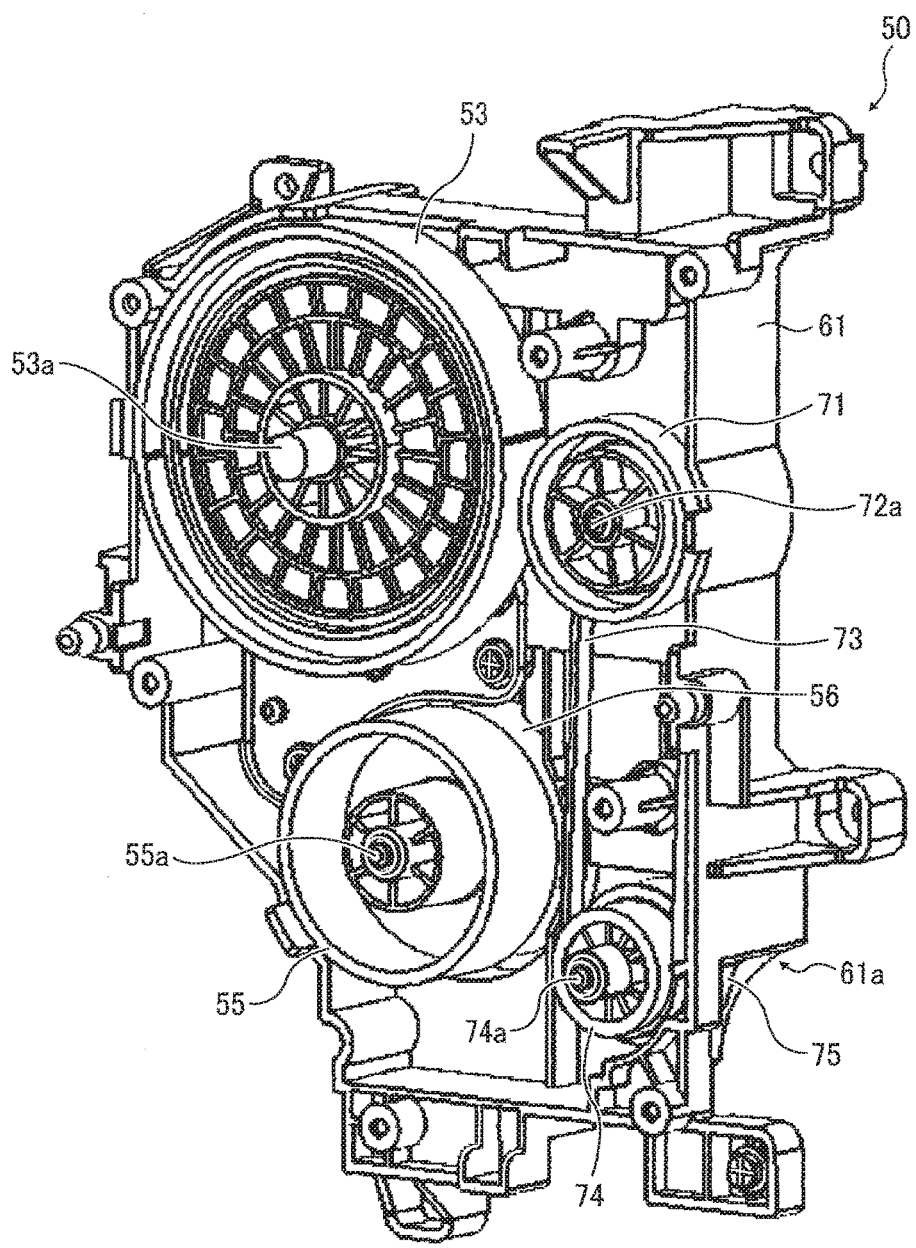
FIG. 4 is a perspective view illustrating an inside of the drive device of FIG. 3.
Figure 5:
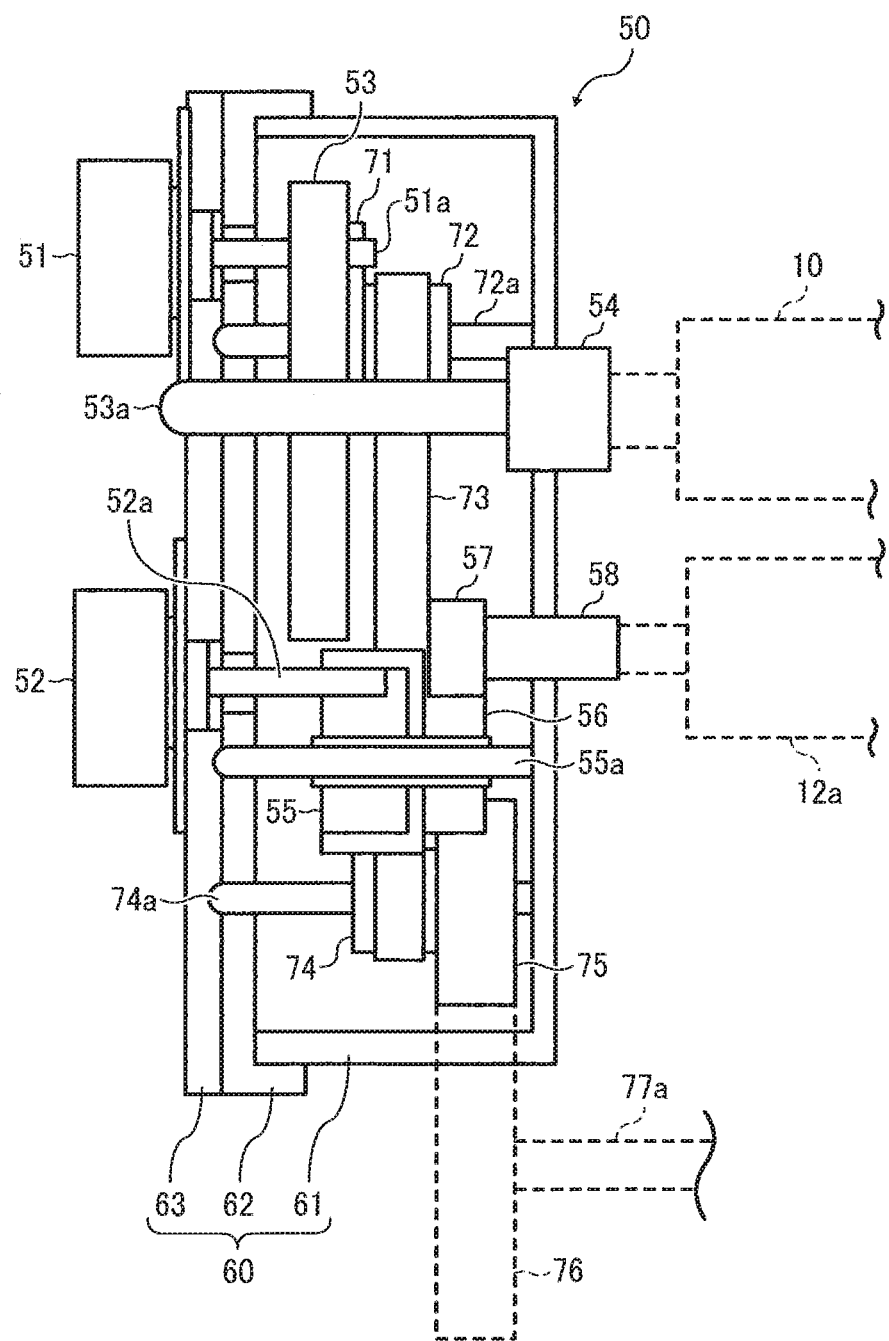
FIG. 5 is a cross sectional view illustrating the drive device of FIG. 3.

Next, a description is given of details of the image forming apparatus 100 according to an example of this disclosure with reference to FIGS. 3, 4, and 5.

FIG. 3 is a perspective view illustrating a drive device 50 included in the image forming apparatus 100 of FIG. 1. FIG. 4 is a perspective view illustrating an inside of the drive device 50 of FIG. 3. FIG. 5 is a cross sectional view illustrating a schematic configuration of the drive device 50 of FIG. 3.

The drive device 50 drives the photoconductor 10 and the developing roller 12*a*. The drive device 50 includes a holder 60 to retain drive transmitting members such as a photoconductor drive motor 51, a developing motor 52, and gears to transmit respective driving forces of the photoconductor drive motor 51 and the developing motor 52, both of which functioning as a drive source.

The holder 60 includes a resin housing 61, a bracket 62, and a vibration control panel 63. The bracket 62 is a metallic bracket that functions as a first holding member. The vibration control panel 63 is a metallic panel that functions as a second holding member.

As illustrated in FIGS. 4 and 5, the resin housing 61 accommodates a photoconductor drive gear 53, a developing internally toothed gear 55, a developing driven gear 56, and a developing idler gear 57, each of which functioning as a drive transmitting member. The resin housing 61 further accommodates drive transmitting members that transmit a driving force to a waste toner conveying screw by which waste toner collected and fallen into the waste toner bottle 41 is conveyed to a far side of the waste toner bottle 41. Specifically, these drive transmitting members are a conveyance drive gear 71, a conveyance drive pulley 72, a conveyance timing belt 73, a conveyance driven pulley 74, and a conveyance idler gear 75.

The photoconductor drive gear 53 is fixed to a photoconductor drive shaft 53*a* that is formed by metal and is rotatably supported by the holder 60 and is meshed with a motor gear 51*a* of the photoconductor drive motor 51. One end of the photoconductor drive shaft 53*a* passes through the bracket 62 and the vibration control panel 63 and is rotatably supported to the bracket 62. The other end of the photoconductor drive shaft 53*a* is attached by a photoconductor drive side coupling 54 and is rotatably supported to the resin housing 61. The photoconductor drive side coupling 54 is linked to a photoconductor driven side coupling that is fixed to one end of a rotary shaft of the photoconductor 10.

The developing internally toothed gear 55 is rotatably supported by a developing drive pin 55*a* and is meshed with a motor gear 52*a* of the developing motor 52. The motor gear 52*a* functions as an externally toothed gear. The developing drive pin 55*a* that functions as a support shaft is formed by metal and is fixed to the resin housing 61. The developing internally toothed gear 55 and the developing driven gear 56 that is disposed coaxially with the developing internally toothed gear 55 are made as a resin integrated molding. The developing driven gear 56 is meshed with the developing idler gear 57. A tip of the developing drive pin 55*a* is fitted and positioned to the bracket 62.

A developing drive side coupling 58 is mounted on an axial center of the developing idler gear 57. The developing drive side coupling 58 passes through the resin housing 61 and is rotatably supported by the resin housing 61. The developing drive side coupling 58 is linked to a developing driven side coupling that is fixed to an end of a rotary shaft of the developing roller 12*a*. The developing idler gear 57 and the developing drive side coupling 58 are made as a resin integrated molding.

Further, the motor gear 51*a* of the photoconductor drive motor 51 is meshed with the conveyance drive gear 71. The conveyance drive pulley 72 is made with the conveyance drive gear 71 as a resin integrated molding and the conveyance driven pulley 74 is made with the conveyance idler gear 75 as a resin integrated molding. The conveyance timing belt 73 is wound around the conveyance drive pulley 72 and the conveyance driven pulley 74.

Instead of the conveyance timing belt 73, a conveyance V-belt may be employed to transmit a driving force via respective frictional forces of the conveyance drive pulley 72 and the conveyance driven pulley 74.

One end of the resin integrated molding that includes the conveyance drive gear 71 and the conveyance drive pulley 72 is rotatably supported by a conveyance drive pin 72*a* that is formed by metal and is fixed to the resin housing 61. A tip of the conveyance drive pin 72*a* is fitted and positioned to the bracket 62.

The resin integrated molding that includes the conveyance idler gear 75 and the conveyance driven pulley 74 is rotatably supported by a conveyance driven pin 74*a* that is formed by metal and is fixed to the resin housing 61. A tip of the conveyance driven pin 74*a* is fitted and positioned to the bracket 62.

As illustrated in FIG. 4, part of the conveyance idler gear 75 is exposed from a side opening 61*a* of the resin housing 61. A screw drive gear 76 is fixed to one end of a screw shaft 77*a* of the waste toner conveying screw. As illustrated in FIG. 5, the screw drive gear 76 is meshed with the conveying idler gear 75 through the side opening 61*a*.

As illustrated in FIG. 3, one end of a ground plate 65 that is grounded is screwed to the bracket 62 with a screw 83. Further, one end of the photoconductor drive shaft 53*a* that is passed through the bracket 62 is fixed to one end of a grounding electrode 64. The other end of the grounding electrode 64 is screwed to the bracket 62 with a screw 82. Accordingly, the photoconductor 10 is grounded via the photoconductor drive shaft 53*a*, the grounding electrode 64, the bracket 62, and the ground plate 65.

A description is given of a detailed configuration of the drive device 50 according to an example of this disclosure, with reference to FIGS. 6 through 13.

Figure 6:
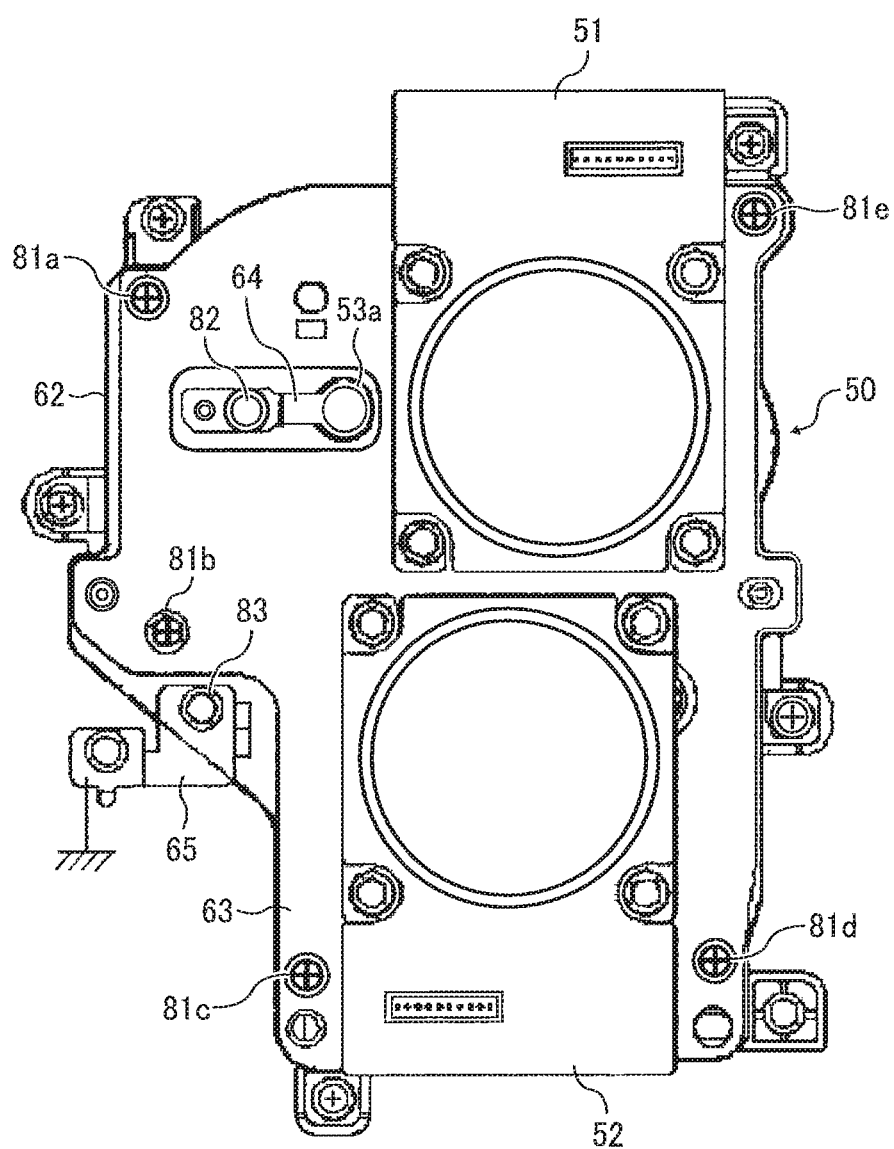
FIG. 6 is a front view illustrating of the drive device on a motor side.

FIG. 6 is a front view illustrating of the drive device 50 on a motor side.

As illustrated in FIG. 6, the vibration control panel 63 and the bracket 62 are disposed overlapping each other. Five (5) end portions of the vibration control panel 63 are fixed to the resin housing 61 by respective screws 81*a* through 81*e* via the bracket 62. Consequently, the bracket 62 and the vibration control panel 63 are partly bonded to each other with the screws 81*a* through 81*e* at the five end portions of the vibration control panel 63. In addition, the photoconductor drive motor 51 and the developing motor 52 are screwed to the bracket 62 via the vibration control panel 63.

The holder 60 of the drive device 50 includes multiple vibration members, for example, multiple drive transmitting members such as the photoconductor drive gear 53 and the developing internally toothed gear 55, the photoconductor drive motor 51, and the developing motor 52. It is likely that vibration caused by the multiple vibration members generates noise. Vibration caused by the photoconductor drive motor 51 and the developing motor 52 is transmitted to the vibration control panel 63 that contacts the photoconductor drive motor 51 and the developing motor 52, and therefore the vibration control panel 63 vibrates. By contrast, vibration caused by the multiple drive transmitting members such as the photoconductor drive gear 53 and the developing internally toothed gear 55 is transmitted to the bracket 62 via the photoconductor drive shaft 53*a*, the developing drive pin 55*a*, the conveyance drive pin 72*a*, and the conveyance driven pin 74*a*. As a result, this transmission of vibration vibrates the bracket 62.

As previously described, the bracket 62 and the vibration control panel 63 are disposed overlapping each other and partly bonded to each other with the screws 81*a* through 81*e* at the five end portions of the vibration control panel 63, as illustrated in FIG. 6. Therefore, the vibration control panel 63 and the bracket 62 do not vibrate together but vibrate individually. Specifically, the vibration control panel 63 vibrates due to vibration caused by the photoconductor drive motor 51 and the developing motor 52 and the bracket 62 vibrates due to vibration caused by the multiple transmission members such as gears contained in the resin housing 61. The vibrations of the vibration control panel 63 and the bracket 62 interfere with each other at the five end portions where the vibration control panel 63 and the bracket 62 are screwed with the screws 81a through 81e at the five end portions of the vibration control panel 63. At this time, respective rigidities and bonding portions of the vibration control panel 63 and the bracket 62 are adjusted so as to generate a phase difference to cancel vibration of the vibration control panel 63 and vibration of the bracket 62 with each other at the bonding portions. By so doing, respective amounts of vibrations of the vibration control panel 63 and the bracket 62 are reduced.

Figure 7:
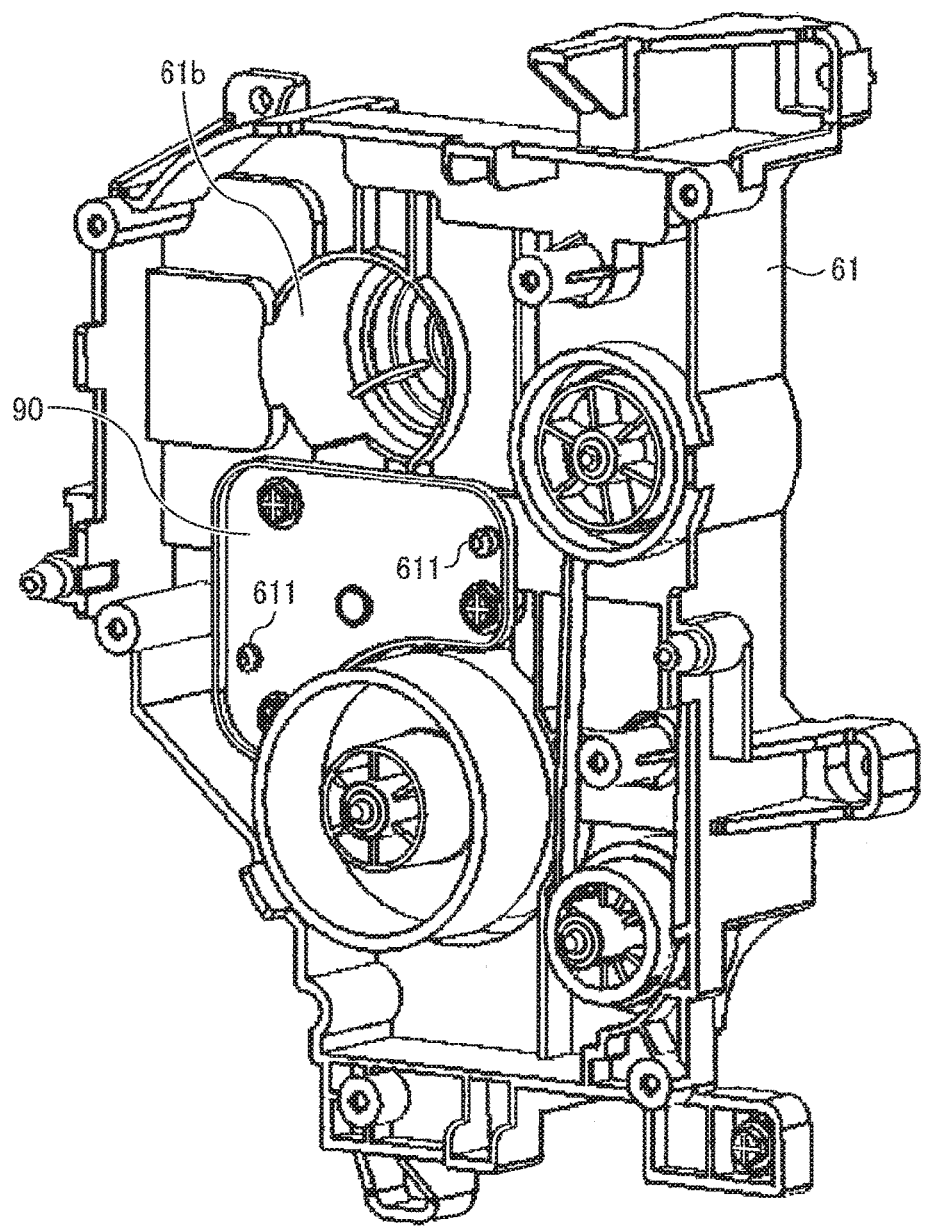
FIG. 7 is a perspective view illustrating the drive device where a photoconductor drive gear and a photoconductor drive shaft are removed from a housing thereof.

FIG. 7 is a perspective view illustrating the drive device 50 where the photoconductor drive gear 53 and the photoconductor drive shaft 53a are removed from the resin housing 61 thereof.

As illustrated in FIG. 7, a reinforcement plate 90 is screwed to the resin housing 61. The reinforcement plate 90 functions as a reinforcing member to reinforce the resin housing 61.

Figure 8A:
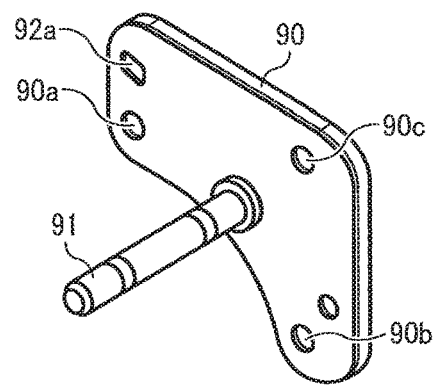
FIGS. 8A and 8B are diagrams of a schematic configuration of a reinforcement plate.
Figure 8B:
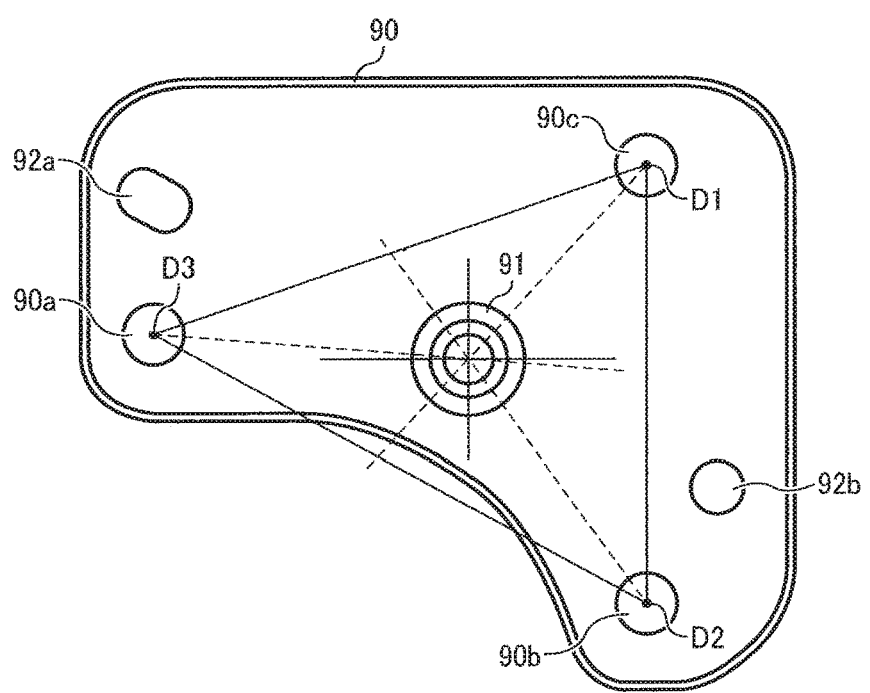

FIGS. 8A and 8B are diagrams of a schematic configuration of the reinforcement plate 90.

As illustrated in FIGS. 8A and 8B, the reinforcement plate 90 includes a developing support shaft 91 that rotatably supports the resin integrated molding including the developing idler gear 57 and the developing drive side coupling 58. The reinforcement plate 90 has screw through holes 90a, 90b, and 90c at three different portions, through which respective screws pass. The screw through holes 90a, 90b, and 90c function as respective fixing portions.

Further, the reinforcement plate 90 are further provided with a sub reference hole 92a and a main reference hole 92b. The sub reference hole 92a is a slot and the main reference hole 92b is a round opening. As illustrated in FIG. 7, both the sub reference hole 92a and the main reference hole 92b are fitted to respective positioning projections 611 provided to the resin housing 61. By so doing, the reinforcement plate 90 is positioned to the resin housing 61.

As illustrated in FIG. 8B, the developing support shaft 91 is provided in a position of the center of gravity of a polygon that is formed by connecting fixed portions D1, D2, and D3 of the reinforcement plate 90 to be fixed to the resin housing 61. The fixed portions D1, D2, and D3 are respective centers of the screw through holes 90a, 90b, and 90c, respectively. In this example, the polygon is a triangle.

By providing the developing support shaft 91 at the above-described position, a force applied to the developing support shaft 91 can be dispersed equally to three fixed portions of the reinforcement plate 90, and therefore torsion of the reinforcement plate 90 can be prevented.

Figure 9:
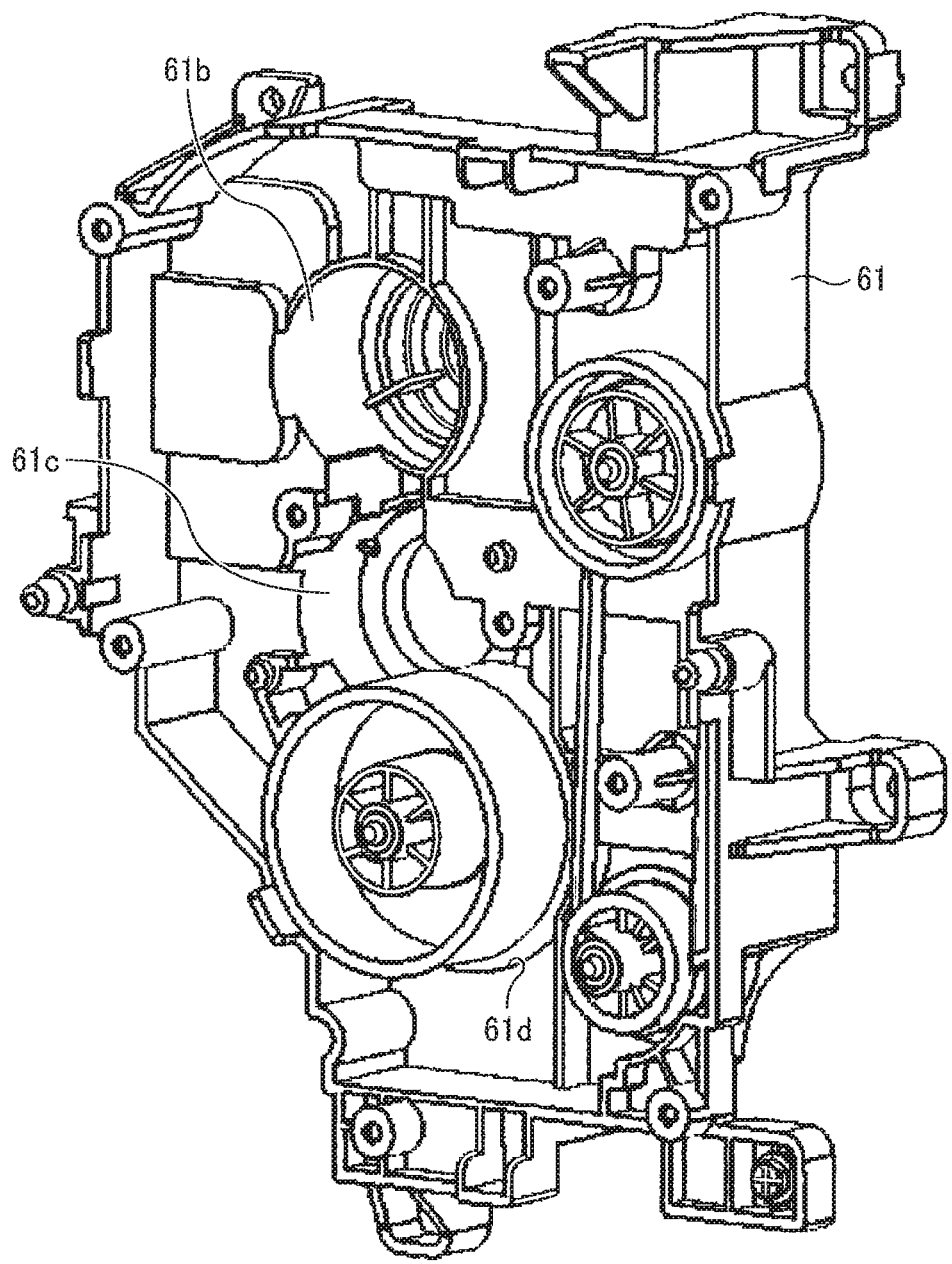
FIG. 9 is a perspective view illustrating the housing of the drive device where a resin molded product including the reinforcement plate, a developing idler gear, a development drive side coupling is further removed from the housing of FIG. 7.

FIG. 9 is a perspective view illustrating the resin housing 61 of the drive device 50 where the resin integrated molding that includes the reinforcement plate 90, the developing idler gear 57, and the developing drive side coupling 58 is further removed from the resin housing 61 of FIG. 7.

As illustrated in FIG. 9, the resin housing 61 includes a first storage recess 61b that stores the photoconductor drive side coupling 54, a second storage recess 61c that stores the developing idler gear 57, and a third storage recess 61d that stores the developing driven gear 56. The first storage recess 61b, the second storage recess 61c, and the third storage recess 61d are continuously connected to each other to form a large recess, and a substantially center of the resin housing 61 is recessed significantly in a vertical direction of the resin housing 61 in FIG. 9. The large recess of the resin housing 61 has a lower rigidity, and therefore the resin housing 61 can be easily deformed in the large recess when a compressive force is applied to the resin housing 61 in a horizontal (left-to-right) direction in FIG. 9. Therefore, as illustrated in FIG. 7, in order to reinforce the resin housing 61, the reinforcement plate 90 is fixed to the resin housing 61 such that the reinforcement plate 90 is bridged across the large recess formed by three storage recesses (i.e., the first storage recess 61b, the second storage recess 61c, and the third storage recess 61d) connected to each other. According to this configuration, the reinforcement plate 90 is extended stiff with respect to the compressive force applied in the horizontal direction in FIG. 9, and therefore deformation of the resin housing 61 can be prevented. As a result, the above-described configuration can prevent the resin housing 61 from vibration, and therefore can reduce vibration of the drive device 50.

In this example, the developing internally toothed gear 55 is a gear that meshes with the motor gear 52a of the developing motor 52. By so doing, a contact ratio with the motor gear 52a can be increased, and occurrence of rotation fluctuation, noise, and vibration can be prevented.

As a comparative example, there is a drive transmitter that includes an internally toothed gear formed of resin and a support shaft fixed to a frame thereof. The internally toothed gear is rotatably supported by the support shaft directly without using a bearing. Such resin internally toothed gears can reduce the weight, noise, and friction compared with metallic gears.

The drive device 50 according to this example includes gears formed of resin having high lubricity such as polyacetal (POM) having good smoothness. However, if the developing internally toothed gear 55 is formed of resin having high lubricity, sufficient strength thereof cannot be obtained. An internally toothed gear is provided with teeth on a cylindrical inner circumferential surface thereof, and therefore, due to structure reasons, the rigidity thereof is lower than the rigidity of an externally toothed gear that is provided with teeth on a cylindrical outer circumferential surface thereof. In addition, since the externally toothed gear is inserted to the internally toothed gear, the internally toothed gear cannot be reinforced by providing ribs therein. Accordingly, the rigidity of an internally toothed gear cannot be increased, and therefore sufficient strength cannot be obtained.

For the above-described reasons, the configuration of this example employs the high-rigidity resin integrated molding that includes the developing internally toothed gear 55 and the developing driven gear 56.

However, there are tradeoffs between rigidity and lubricity of resin. In a case (in a comparative example) in which the resin integrated molding having the developing internally toothed gear 55 and the developing driven gear 56 is formed by a resin having high rigidity, smoothness thereof with the developing drive pin 55a is reduced. As a result, it is likely that abnormal sound is generated between the developing drive pin 55a and the resin integrated molding including the developing internally toothed gear 55 and the developing driven gear 56. Further, it is also likely to cause inconvenience that the developing drive pin 55a provided in the resin integrated molding is worn at an early stage.

However, there are tradeoffs between rigidity and lubricity. An internally toothed gear formed with high-rigidity resin increases a friction force between a support shaft and the internally toothed gear, thereby decreasing smoothness. As a result, when the internally toothed gear slides on the support shaft, inconveniences such as abnormal sound and abrasion of the internally toothed gear and the support shaft have been generated.

Therefore, the internally toothed gear may be rotatably supported by a support shaft via a bearing. However, the bearing is employed to this configuration, and therefore the number of parts increases to cause an increase in cost of the image forming apparatus.

Further, the internally toothed gear may be unrotatably fixed to the support shaft and the support shaft may be rotatably fixed to a frame of the drive device without the bearing. The frame of the drive device supports multiple parts such as a drive motor and drive transmitting units, and therefore includes glass fiber, for example, to obtain rigidity greater than the internally toothed gear. Since the frame of the drive device has the rigidity greater than the internally toothed gear, the lubricity thereof is lower than the internally toothed gear, and therefore the smoothness between the frame and the support shaft is lower than smoothness between the internally toothed gear having a high rigidity and the support shaft. Due to these reasons, it is not preferable to employ a configuration in which the internally toothed gear is unrotatably fixed to the support shaft and the support shaft is rotatably fixed to the frame of the drive device without the bearing. Further, when the support shaft is rotatably supported to the frame of the drive device via the bearing, the bearing may need to this configuration, and therefore an increase in the number of parts can cause an increase in cost of the image forming apparatus.

In this example, the developing drive pin 55*a* includes a grease retainer to retain or contain grease. The grease retainer supplies grease to a slide portion where the resin integrated molding that includes the developing internally toothed gear 55 and the developing driven gear 56 contacts the developing drive pin 55*a*.

A detailed description is given of the grease retainer included in the developing drive pin 55*a*.

Figure 10:
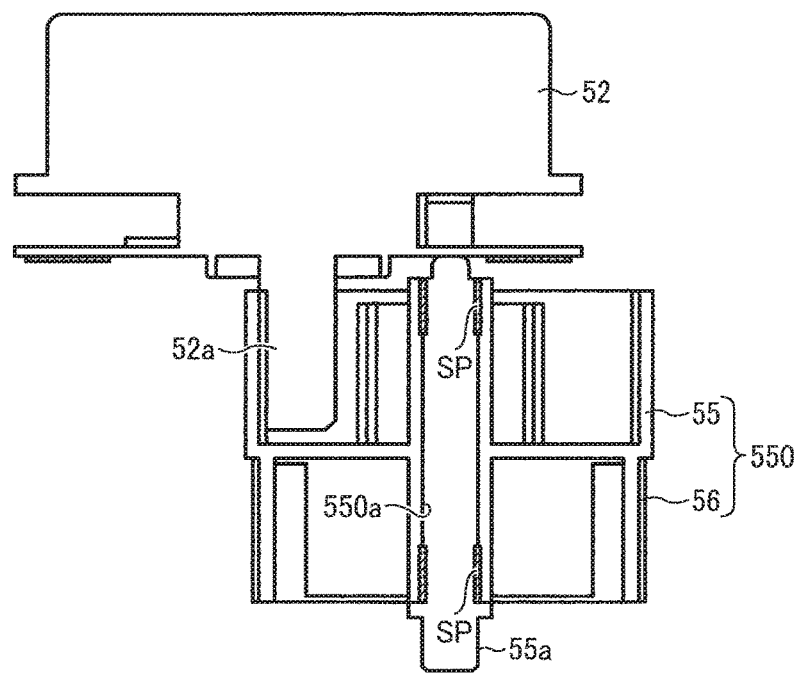
FIG. 10 is a diagram illustrating a slide portion where the resin molded product having a developing internally toothed gear and a developing driven gear slidably contacts a developing drive pin.

FIG. 10 is a diagram illustrating a slide portion SP where a resin molding 550 that includes the developing internally toothed gear 55 and the developing driven gear 56 slidably contacts the developing drive pin 55*a*.

As illustrated in FIG. 10, the slide portion SP of the resin molding 550 with respect to the developing drive pin 55*a* is located at or in the vicinity of an end of a pin inserting hole 550*a* to which the developing drive pin 55*a* of the resin molding 550 is inserted. The location of the slide portion SP is determined based on a fact that an end area of the pin inserting hole 550*a* can be molded with accuracy while sink marks are generated in a center area of the pin inserting hole 550*a* due to a mold structure. Therefore, the center area of the pin inserting hole 550*a* is formed greater than a given inner diameter. As a result, the end area of the pin inserting hole 550*a* having a good mold structure contacts and slides with the developing drive pin 55*a*.

Figure 11:
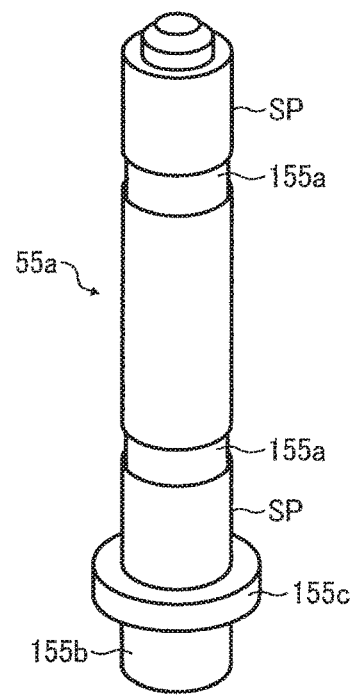
FIG. 11 is a perspective view illustrating the developing drive pin including a grease retainer.
Figure 12:
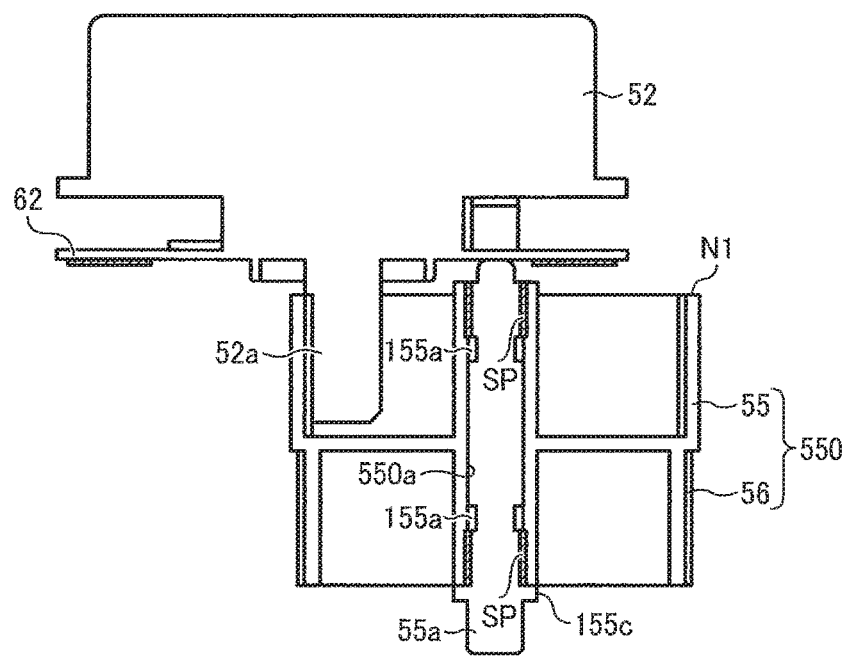
FIG. 12 is an enlarged cross sectional view illustrating the developing drive pin and peripheral parts of the drive device.

FIG. 11 is a perspective view illustrating the developing drive pin 55*a* including a grease retainer. FIG. 12 is an enlarged cross sectional view illustrating the developing drive pin 55*a* and peripheral parts of the drive device 50.

As illustrated in FIG. 11, a grease retaining groove 155*a* that functions as a ring or circular grease retainer is disposed adjacent to the slide portion SP to slide into the pin inserting hole 550*a* in an axial direction on the developing drive pin 55*a*. It is to be noted that the developing drive pin 55*a* may include one or more slide portions SP and one or more grease retaining grooves 155*a*. For example, the developing drive pin 55*a* illustrated in FIG. 11 includes two slide portions SP and two grease retaining grooves 155*a*. The developing drive pin 55*a* further includes a fitting member 155*b* and a flange 155*c*. The fitting member 155*b* fits in the resin housing 61. The flange 155*c* contacts a face of the resin housing 61 when the fitting member 155*b* is fitted in the resin housing 61.

As illustrated in FIG. 12, the developing drive pin 55*a* of this example includes a grease retainer groove 155*a* that functions as a greater retainer. The grease retainer groove 155*a* is a groove facing the inner circumferential surface of the pin inserting hole 550*a* extending in a circumferential direction of the developing drive pin 55*a* other than the slide portion SP where the developing drive pin 55*a* slides on the pin inserting hole 550*a*.

Figure 13:
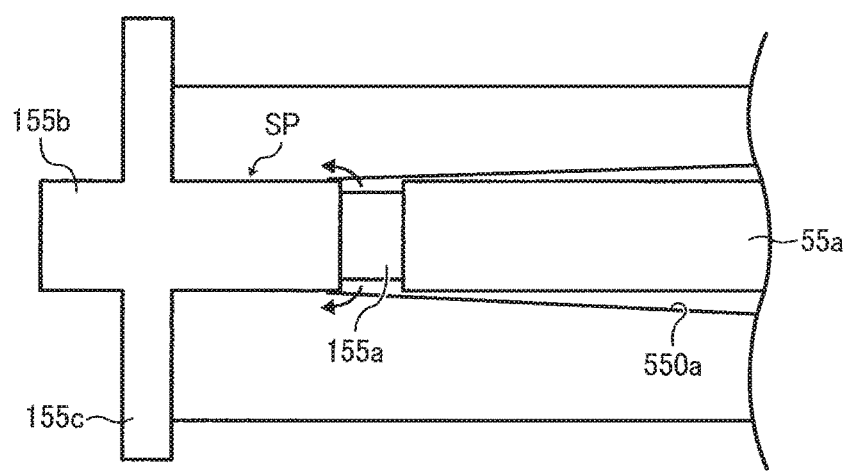
FIG. 13 is a diagram illustrating an action of the developing drive pin 55a in grease supply to the slide portion.

FIG. 13 is a diagram illustrating an action of the developing drive pin 55*a* in grease supply to the slide portion SP.

As illustrated in FIG. 13, a diameter of the pin inserting hole 550*a* gradually increases toward the center thereof due to sink marks generated in molding. Therefore, a gap between the developing drive pin 55*a* and the pin inserting hole 550*a* tapers toward the slide portion SP. Consequently, according to capillary phenomenon, grease held in the grease retaining groove 155*a* flows toward the slide portion SP having the smaller gap, thereby supplying grease to the slide portion SP. By supplying grease in the grease retaining groove 155*a* to the slide portion SP, the slide portion SP is lubricated, and therefore the friction between the developing drive pin 55*a* and the resin molding 550 in the slide portion SP can be reduced. Accordingly, the above-described configuration of this example can prevent occurrence of abnormal sound in the slide portion SP and abrasion on the slide portion SP of the pin inserting hole 550*a*.

Grease may be applied to the end of the pin inserting hole 550*a*. As illustrated in FIG. 12, the end of the pin inserting hole 550*a* on the side of the developing roller 12*a* is in contact with the flange 155*c* of the developing drive pin 55*a*, and therefore slides on the flange 155*c* when transmitting a driving force.

Further, the resin molding 550 may move to the side of the developing motor 52. As illustrated in FIG. 12, the pin inserting hole 550*a* is located closer or projected to the developing motor 52 than an end N1 of the developing internally toothed gear 55 is. According to this structure, when the resin molding 550 moves to the side of the developing motor 52, an end of the pin inserting hole 550*a* on the side of the developing motor 52 contacts the bracket 62, and therefore slides on the bracket 62 when transmitting the driving force. By applying grease to the end of the pin inserting hole 550*a*, smoothness of the pin inserting hole 550*a* on the flange 155*c* and the bracket 62 can be enhanced.

Figure 14:
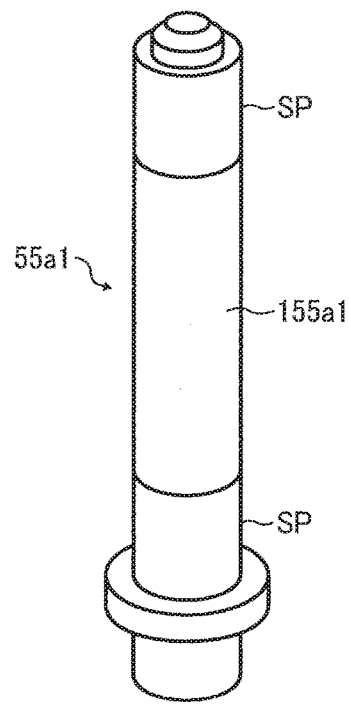
FIG. 14 is a diagram illustrating the developing drive pin according to another example of this disclosure.
Figure 15:
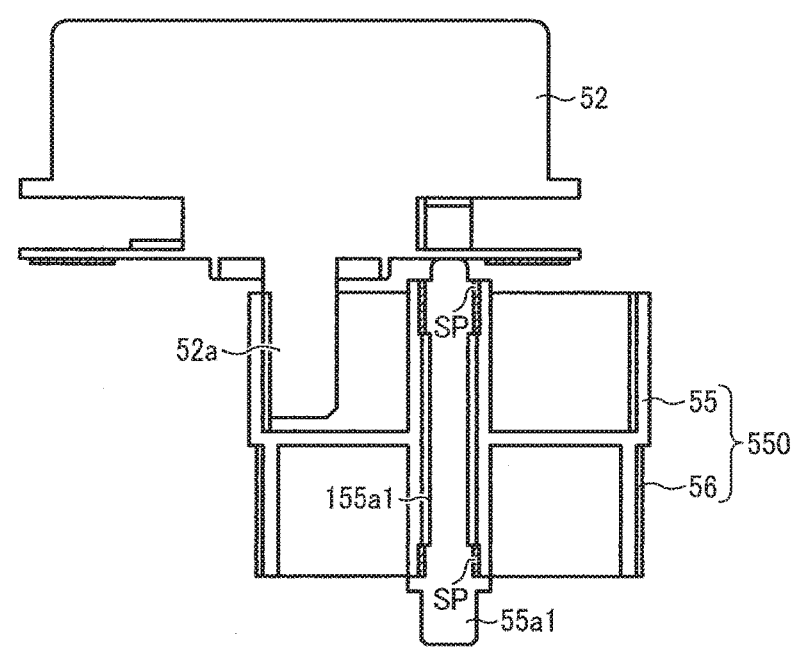
FIG. 15 is an enlarged cross sectional view illustrating the drive device having the developing drive pin according to an example of FIG. 14.

Now, a description is given of a developing drive pin 55*a*1 according to another example of this disclosure with reference to FIGS. 14 and 15.

FIG. 14 is a diagram illustrating a structure of the developing drive pin 55*a*1 according to another example of this disclosure. FIG. 15 is an enlarged cross sectional view illustrating the drive device 50 having the developing drive pin 55*a*1 of FIG. 14.

As illustrated in FIG. 14, the developing drive pin 55*a*1 of this example includes a grease retainer 155*a*1. The grease retainer 155*a*1 is a groove facing the inner circumferential surface of the pin inserting hole 550*a* extending in a circumferential direction of the developing drive pin 55*a*1 other than the slide portion SP where the developing drive pin 55a1 slides on the pin inserting hole 550a.

According to this structure, the grease retainer 155a1 can retain a greater amount of grease when compared to a structure in which the grease retainer 155a1 is a cyclic groove disposed adjacent to the slide portion SP, and supply grease to the slide portion SP for a long time. By so doing, the slide portion SP can be more smooth with grease for a long time, and therefore occurrence of abnormal sound and abrasion of the slide portion SP where the developing drive pin 55a1 slides on the pin inserting hole 550a can be prevented for a long time.

Figure 16:
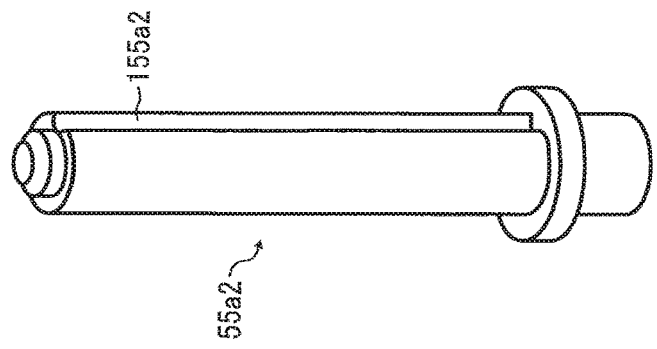
FIG. 16 is a perspective view illustrating the developing drive pin according to yet another example of this disclosure.
Figure 17A:
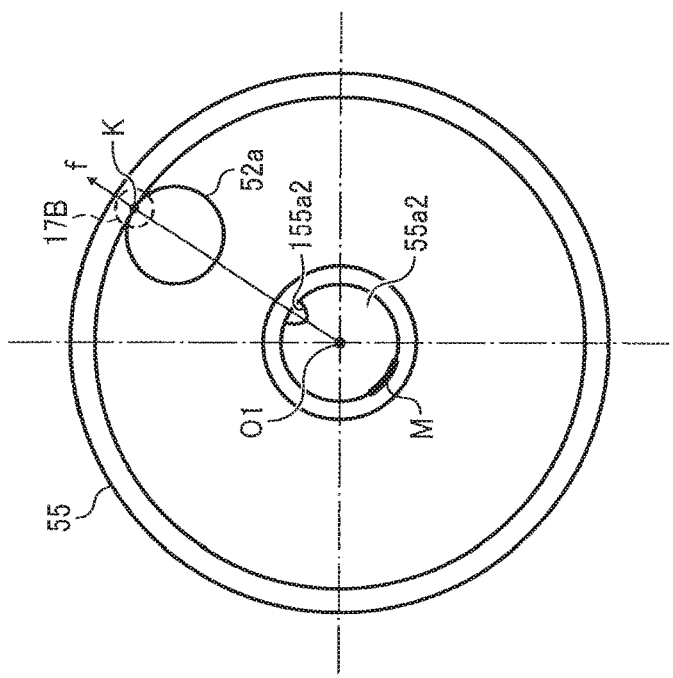
FIG. 17A is a diagram illustrating a position of the grease retainer on the developing drive pin of FIG. 16.
Figure 17B:
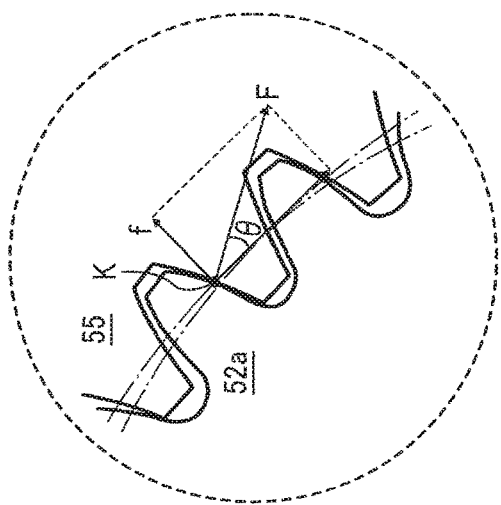
FIG. 17B is an enlarged view illustrating a gear meshing of two gears of FIG. 17A.

Now, a description is given of a developing drive pin 55a2 according to yet another example of this disclosure with reference to FIGS. 16, 17A, and 17B.

FIG. 16 is a perspective view illustrating the developing drive pin 55a2 according to yet another example of this disclosure.

As illustrated in FIG. 16, the developing drive pin 55a2 includes a grease retainer 155a2 that is a groove that extends in an axial direction of the developing drive pin 55a2.

In this example, when the developing drive pin 55a2 is formed of resin, it is easiest and preferable to mold the developing drive pin 55a2 by resin due to a mold structure.

FIG. 17A is a diagram illustrating a position of the grease retainer 155a2 on the developing drive pin 55a2 of FIG. 16. FIG. 17B is a diagram illustrating an enlarged view of the gear meshing of the motor gear 52a of the developing motor 52 and the developing internally toothed gear 55.

As illustrated in FIGS. 17A and 17B, it is preferable that the grease retainer 155a2 is located to the side of which the motor gear 52a of the developing motor 52 and the developing internally toothed gear 55 are meshed with each other. Specifically, it is preferable that the grease retainer 155a2 is located on a line connecting an axial center O1 of the developing drive pin 55a2 and a meshing portion K where teeth of the motor gear 52a mesh with teeth of developing internally toothed gear 55. In other words, the grease retainer 155a2 is located on a side of the meshing portion K when viewed in the axial direction of the developing drive pin 55a2.

A pressure angle θ of which the teeth of the motor gear 52a of the developing motor 52 apply a force to the teeth of the developing internally toothed gear 55 is about 20 degrees. Consequently, a normal direction component "f" of a force transmitted from a tooth of the motor gear 52a to a tooth of the developing internally toothed gear 55 directs in a direction in which the tooth of the developing internally toothed gear 55 separates away from the tooth of the motor gear 52a. Accordingly, the developing internally toothed gear 55 is pushed to a direction indicated by arrow F in FIG. 17B, and therefore a contact pressure applied to a region M that is located opposite to the meshing portion K where the motor gear 52a and the developing internally toothed gear 55 are meshed with each other increases on the slide portion SP of the developing drive pin 55a2 sliding on the pin inserting hole 550a. At this time, if the grease retainer 155a2 is located on the region M that is opposite to a meshing side where the motor gear 52a and the developing internally toothed gear 55 are meshed with each other, it is likely that the end of the grease retainer 155a2 in the circumferential direction cuts or scratches the inner circumferential surface of the pin inserting hole 550a.

By contrast, as illustrated in FIGS. 17A and 17B, the grease retainer 155a2 is provided to the side on which the motor gear 52a of the developing motor 52 and the developing internally toothed gear 55 are meshed with each other. This structure can prevent the inner circumferential surface of the pin inserting hole 550a from hitting hard against the end of the grease retainer 155a2 in a circumferential direction. By so doing, the inner circumferential surface of the pin inserting hole 550a can be prevented from being cut by the end of the grease retainer 155a2 in the circumferential direction.

Further, the developing drive pin 55a includes a grease retainer, i.e., the grease retainer 155a. However, the structure applied to this disclosure is not limited thereto. For example, a structure in which a grease retainer is provided to the inner circumferential surface of the pin inserting hole 550a can be applied to this disclosure.

The configurations according to the above-described embodiment are examples. The present invention can achieve the following aspects effectively.

Aspect 1.

In Aspect 1, a drive transmitter (for example, the drive device 50) includes an internally toothed gear (for example, the developing internally toothed gear 55), a first support shaft (such as the developing drive pin 55a), a drive source (for example, the developing motor 52), a rotary body (for example, the developing roller 12a), and a grease retainer (for example, the grease retaining groove 155a and the grease retainers 155a1 and 155a2). The drive transmitter transmits a driving force applied by the drive source to the rotary body via the internally toothed gear. The internally toothed gear is formed of resin and is rotatably supported by the first support shaft without using a bearing. The grease retainer retains grease in a portion on the first support shaft facing the internally toothed gear and/or a portion on the internally toothed gear facing the first support shaft.

According to Aspect 1, when compared to an internally toothed gear that is formed of metal, the internally toothed gear that is formed of resin can enhance a lighter weight, lower noise, and lower friction of the drive transmitter. Further, by rotatably supporting the internally toothed gear without attaching the bearing to the first support shaft, the number of parts can be reduced, and therefore an increase in cost of an image forming apparatus having the drive transmitter can be prevented. Further, when compared to a case in which the first support shaft is fixed to the internally toothed gear unrotatably and is fixed to a frame of the image forming apparatus, the internally toothed gear that is rotatably supported by the first support shaft can rotate preferably.

In addition, the drive device includes the grease retainer that retains grease in the portion on the first support shaft facing the internally toothed gear and/or the portion on the internally toothed gear facing the first support shaft. By so doing, the grease that is retained in the grease retainer is supplied to a slide portion between the internally toothed gear and the first support shaft, thereby reducing the frictional force generated between the internally toothed gear and the first support shaft.

Accordingly, abnormal sound that is generated when the internally toothed gear slides with the first support shaft can be restrained. Further, abrasion of the internally toothed gear and the first support shaft can be reduced.

Aspect 2.

In Aspect 1, the internally toothed gear is formed of resin. Accordingly, the internally toothed gear can reduce the weight, noise, and friction compared with a metallic gear.

Aspect 3.

In Aspect 1, the grease retainer includes multiple grease retainers.

Accordingly, the multiple grease retainers can supply grease to the slide portion SP between the internally toothed gear such as the developing internally toothed gear 55 and the first support shaft such as the developing drive pin 55*a*.

Aspect 4.

In any of Aspect 1 through Aspect 3, the grease retainer is disposed adjacent to the slide portion where the internally toothed gear such as the developing internally toothed gear 55 slides on the first support shaft such as the developing drive pin 55*a*.

Accordingly, as described in the examples above, the grease that is retained in the grease retainer can be supplied to the slide portion preferably.

Aspect 5.

In any of Aspect 1 through Aspect 4, the grease retainer is a groove that extends in a circumferential direction of the first support shaft.

Accordingly, the grease can be retained in the groove that is cut and extends in the circumferential direction of the first support shaft.

Aspect 6.

In any of Aspect 1 through Aspect 4, the grease retainer is a groove that is cut and extends in an axial direction of the first support shaft.

Accordingly, the grease can be retained in the groove that is cut and extends in the axial direction of the first support shaft. Further, when the first support shaft is made of resin, the grease retainer can be formed in an easy mold structure.

Aspect 7.

In Aspect 6, the drive transmitter further includes an externally toothed gear (for example, the motor gear 52*a*) to mesh with the internally toothed gear (for example, the developing internally toothed gear 55) at their meshing portion and the grease retainer is disposed on a side of the meshing portion in an axial direction of the internally toothed gear.

Accordingly, as described in the examples above with reference to FIGS. 17A and 17B, the slide portion of the developing internally toothed gear 55 facing the first support shaft can be prevented from abrasion at the end of the first support shaft in the circumferential direction of the groove that is cut in the axial direction of the first support shaft, the portion on the developing internally toothed gear 55 facing the first support shaft.

Aspect 8.

In any of Aspect 1 through Aspect 7, the drive device further includes a housing (for example, the resin housing 61) and a reinforcing member (for example, the reinforcement plate 90). The housing accommodates at least one drive transmitting member (for example, the developing driven gear 56, the developing idler gear 57, and the like in the above-described examples) in a recess thereof. The at least one drive transmitting member transmits the driving force to the internally toothed gear (for example, the developing internally toothed gear 55) and to the rotary body (for example, the developing roller 12*a*) via the internally toothed gear. The reinforcing member reinforces the housing and is bridged across the recess and fixed to the housing.

Accordingly, as described in the examples above, rigidity of the housing such as the resin housing 61 can be increased and deformation of the housing can be restrained.

Aspect 9.

In Aspect 8, the reinforcing member such as the reinforcement plate 90 includes a second support shaft (for example, the developing support shaft 91) of the drive transmitting member to rotatably support the drive transmitting member (for example, the developing idler gear 57). The reinforcing member has three or more fixing portions at which the reinforcing member is fixed to the housing (for example, the resin housing 61). The second support shaft of the drive transmitting member is provided in a position of the center of gravity of a polygon that is formed by connecting fixed portions of the reinforcing member.

Accordingly, as described in the examples above with reference to FIG. 8B, a force applied to the support shaft of the drive transmitting member (such as the developing support shaft 91) can be dispersed equally to multiple fixed portions of the reinforcing member, and therefore torsion of the reinforcement plate 90 can be prevented.

Aspect 10.

An image forming apparatus includes an image bearer and the drive transmitter according to any one of the Aspect 1 through Aspect 9.

Accordingly, the drive transmitter can enhance a lightweight, less noise device, and retain an increase in cost of the image forming apparatus.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:

1. A drive transmitter, comprising:
a rotary body including a drive transmission portion; and
a support shaft configured to support the rotary body,
the support shaft including a support shaft side slide portion near both ends in an axial direction of the support shaft,
the rotary body including a support shaft inserting hole into which the support shaft is inserted, and a rotary body side slide portion disposed near a portion at which the support shaft inserting hole is opposed to the support shaft side slide portion,
a diameter of the support shaft inserting hole gradually increasing from a peripheral portion of the rotary body side sliding portion toward a peripheral portion of the center in the axial direction of the support shaft inserting hole.

2. The drive transmitter according to claim 1,
wherein the rotary body is a two-stage gear, and
wherein a diameter of one gear of the two-stage gear is smaller than a diameter of the other gear of the two-stage gear.

3. The drive transmitter according to claim 2,
wherein the other gear of the two-stage gear has external teeth.

4. An image forming apparatus comprising the drive transmitter according to claim 1.

5. A drive transmitter, comprising:
a rotary body including a drive transmission portion;
a support shaft configured to support the rotary body,
the rotary body including a support shaft inserting hole into which the support shaft is inserted, an inner circumferential cylindrical portion constituting the support shaft inserting hole, and an outer circumferential cylindrical portion constituting the drive transmission portion; and a coupling portion configured to couple the outer circumferential cylindrical portion and the inner circumferential cylindrical portion in a radial direction of the rotary body, a diameter of the support shaft inserting hole gradually increasing from a peripheral portion of an axial end portion of the support shaft inserting hole toward a joint portion of the coupling portion and the inner circumferential cylindrical portion.

6. The drive transmitter according to claim 5,
wherein the coupling portion is integrally molded with the outer circumferential cylindrical portion and the inner circumferential cylindrical portion of the rotary body.

7. The drive transmitter according to claim 5,
wherein the coupling portion is coupled to the inner circumferential cylindrical portion near the center in an axial length of the inner circumferential cylindrical portion.

8. The drive transmitter according to claim 5,
wherein the support shaft includes a ring-shaped protrusion configured to contact an end portion of the inner circumferential cylindrical portion.

* * * * *